United States Patent
Akiba

(10) Patent No.: US 11,435,659 B2
(45) Date of Patent: Sep. 6, 2022

(54) PROJECTION OPTICAL SSTEMS AND METHODS HAVING VARIABLE DIAPHRAGM BASED ON AVERAGE LUMINANCE AND GRAYSCALE

(71) Applicant: SONY GROUP CORPORATION, Tokyo (JP)

(72) Inventor: Akira Akiba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/282,411

(22) PCT Filed: Sep. 19, 2019

(86) PCT No.: PCT/JP2019/036760
§ 371 (c)(1),
(2) Date: Apr. 2, 2021

(87) PCT Pub. No.: WO2020/075471
PCT Pub. Date: Apr. 16, 2020

(65) Prior Publication Data
US 2021/0389655 A1 Dec. 16, 2021

(30) Foreign Application Priority Data

Oct. 10, 2018 (JP) .............................. JP2018-191945

(51) Int. Cl.
*G03B 21/20* (2006.01)
*G09G 3/00* (2006.01)
(Continued)

(52) U.S. Cl.
CPC ......... *G03B 21/2053* (2013.01); *G09G 3/002* (2013.01); *G09G 3/2007* (2013.01); *G09G 3/3406* (2013.01); *G09G 2360/16* (2013.01)

(58) Field of Classification Search
CPC .................................................. G03B 21/2053
(Continued)

(56) References Cited

U.S. PATENT DOCUMENTS

| 5,519,518 A | 5/1996 | Watanabe et al. |
| 2002/0044261 A1* | 4/2002 | Ouchi .................. G03B 21/005 353/31 |

(Continued)

FOREIGN PATENT DOCUMENTS

| CN | 1717714 A | 1/2006 |
| CN | 1989448 A | 6/2007 |

(Continued)

OTHER PUBLICATIONS

International Search Report prepared by the Japan Patent Office dated Oct. 25, 2019, for International Application No. PCT/JP2019/036760.

*Primary Examiner* — Long D Pham
(74) *Attorney, Agent, or Firm* — Sheridan Ross P.C.

(57) ABSTRACT

An illumination device according to the present disclosure includes: an illumination optical system that includes a first variable diaphragm and a second variable diaphragm, and that generates illumination light used for generation of an image by a pulse width modulation method on the basis of light from the light source; a luminance calculating section that calculates average luminance at least for each frame in an image signal; a gray-scale evaluation computing section that evaluates a gray-scale value in a screen for each display period of at least a unit gray-scale bit; a first aperture diameter determining section that determines an aperture diameter of the first variable diaphragm on the basis of the average luminance calculated by the luminance calculating section; and a second aperture diameter determining section that determines an aperture diameter of the second variable (Continued)

diaphragm on the basis of evaluation by the gray-scale evaluation computing section.

15 Claims, 12 Drawing Sheets

(51) Int. Cl.
    *G09G 3/20*     (2006.01)
    *G09G 3/34*     (2006.01)

(58) Field of Classification Search
    USPC .......................................................... 345/691
    See application file for complete search history.

(56) References Cited

U.S. PATENT DOCUMENTS

| | | | |
|---|---|---|---|
| 2004/0080722 A1 | 4/2004 | Yamasaki et al. | |
| 2005/0001997 A1 | 1/2005 | Kawaai et al. | |
| 2009/0244496 A1* | 10/2009 | Sugino | G03B 21/2053 353/85 |
| 2012/0154681 A1* | 6/2012 | Morimoto | G03B 21/2053 348/645 |
| 2014/0022513 A1* | 1/2014 | Mizuno | H04N 9/3194 353/31 |
| 2017/0064269 A1 | 3/2017 | Schuck et al. | |

FOREIGN PATENT DOCUMENTS

| | | |
|---|---|---|
| CN | 101131530 A | 2/2008 |
| CN | 102472952 A | 5/2012 |
| CN | 103543581 A | 1/2014 |
| CN | 106161976 A | 11/2016 |
| JP | H08-106090 | 4/1996 |
| JP | 2001033875 A | 2/2001 |
| JP | 2004-151674 | 5/2004 |
| JP | 2005-003744 | 1/2005 |
| JP | 2006-285089 | 10/2006 |
| JP | 2013-168836 | 8/2013 |
| JP | 2016-170436 | 9/2016 |

\* cited by examiner (A)   (B)

FIG. 14

| SEQUENCE NUMBER | APERTURE RATIO OF SECOND VARIABLE DIAPHRAGM (1 = 100%) |
|---|---|
| 0 | 0.00 |
| 1 | 0.07 |
| 2 | 0.13 |
| 3 | 0.20 |
| 4 | 0.27 |
| 5 | 0.33 |
| 6 | 0.40 |
| 7 | 0.47 |
| 8 | 0.53 |
| 9 | 0.60 |
| 10 | 0.67 |
| 11 | 0.73 |
| 12 | 0.80 |
| 13 | 0.87 |
| 14 | 0.93 |
| 15 | 1.00 |

PROJECTION OPTICAL SYSTEMS AND METHODS HAVING VARIABLE DIAPHRAGM BASED ON AVERAGE LUMINANCE AND GRAYSCALE

CROSS REFERENCE TO RELATED APPLICATIONS

This application is a national stage application under 35 U.S.C. 371 and claims the benefit of PCT Application No. PCT/JP2019/036760 having an international filing date of 19 Sep. 2019, which designated the United States, which PCT application claimed the benefit of Japanese Patent Application No. 2018-191945 filed 10 Oct. 2018, the entire disclosures of each of which are incorporated herein by reference.

TECHNICAL FIELD

The present disclosure relates to an illumination device including an illumination optical system provided with a variable diaphragm, and a display apparatus.

BACKGROUND ART

For example, a display apparatus using a mirror array device such as a micromirror array (MMA) as a light modulation element performs gray-scale control by a PWM (Pulse Width Modulation) method. Meanwhile, for projectors, there is a technology called dynamic contrast for adjusting contrast by providing an illumination optical system with a variable diaphragm. In addition, for projectors, there is a technology for improving contrast by providing each of an illumination optical system and a projection optical system with a variable diaphragm (see PTL 1).

CITATION LIST

Patent Literature

PTL 1: Japanese Unexamined Patent Application Publication No. 2006-285089

SUMMARY OF THE INVENTION

In gray-scale control by a typical PWM method, the number of gray-scale levels is limited. In addition, typical dynamic contrast is a technology for increasing and decreasing a light amount of an entire screen for each scene, and is not for improving contrast of any given region in the screen.

It is desirable to provide an illumination device that makes it possible to improve gray-scale representation in performing generation of an image by a PWM method, and a display apparatus.

An illumination device according to an embodiment of the present disclosure includes: an illumination optical system that includes a first variable diaphragm and a second variable diaphragm in order of incidence of light from a light source, and generates illumination light used for generation of an image by a pulse width modulation method on the basis of light from the light source; a luminance calculating section that calculates average luminance at least for each frame in an image signal; a gray-scale evaluation computing section that evaluates a gray-scale value in a screen for each display period of at least a unit gray-scale bit; a first aperture diameter determining section that determines an aperture diameter of the first variable diaphragm on the basis of the average luminance calculated by the luminance calculating section; and a second aperture diameter determining section that determines an aperture diameter of the second variable diaphragm on the basis of evaluation evaluated by the gray-scale evaluation computing section.

A display apparatus according to an embodiment of the present disclosure includes: a light modulation element that modulates illumination light by a pulse width modulation method to generate an image; an illumination optical system that includes a first variable diaphragm and a second variable diaphragm in order of incidence of light from a light source, and generates illumination light used for generation of an image by the pulse width modulation method on the basis of light from the light source; a luminance calculating section that calculates average luminance at least for each frame in an image signal; a gray-scale evaluation computing section that evaluates a gray-scale value in a screen for each display period of at least a unit gray-scale bit; a first aperture diameter determining section that determines an aperture diameter of the first variable diaphragm on the basis of the average luminance calculated by the luminance calculating section; and a second aperture diameter determining section that determines an aperture diameter of the second variable diaphragm on the basis of evaluation by the gray-scale evaluation computing section.

In the illumination device or the display apparatus according to the embodiment of the present disclosure, the aperture diameter of the first variable diaphragm is determined on the basis of the average luminance at least for each frame calculated by the luminance calculating section. In addition, the aperture diameter of the second variable diaphragm is determined on the basis of the gray-scale value in the screen for each display period of at least a unit gray-scale bit by the gray-scale evaluation computing section.

BRIEF DESCRIPTION OF THE DRAWINGS

FIG. 14 is an explanatory diagram illustrating an example of a relationship between sequence numbers in a PWM sequence and an aperture ratio of the second variable diaphragm in the display apparatus according to the first embodiment.

MODES FOR CARRYING OUT THE INVENTION

Figure 1:
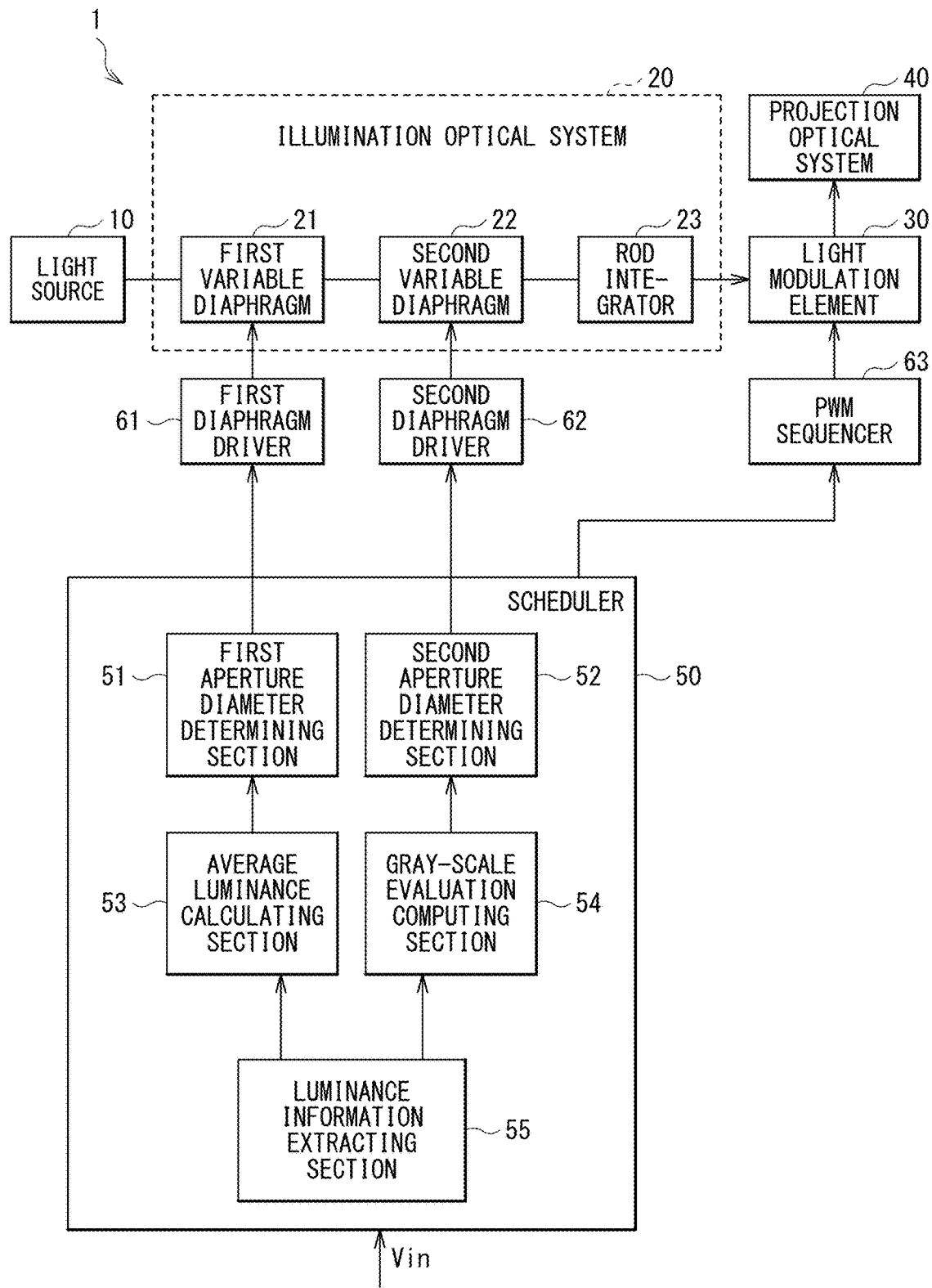
FIG. 1 is a schematic block diagram illustrating a configuration example of a display apparatus according to a first embodiment of the present disclosure.

Some embodiments of the present disclosure are described in detail below with reference to drawings. It is to be noted that description is given in the following order.

0. Comparative Example
1. First Embodiment (FIGS. 1 to 16)
1.1 Configuration of Display Apparatus according to First Embodiment
1.2 Operation of Display Apparatus according to First Embodiment
1.3 Effects
1.4 Modification Example of First Embodiment
2. Other Embodiments

0. Comparative Example (Overview and Issues of Display Apparatus According to Comparative Example)

For projectors, a technology of typical dynamic contrast in which an illumination optical system is provided with a variable diaphragm is a technology for adjusting a light amount of an entire image for each scene, and is not for expanding a dynamic range of any given region in a screen like a liquid crystal display for TV (television), or the like. Accordingly, the technology is similar to but different from a so-called HDR (High Dynamic Range) technology, and a dynamic range of a real image is not perceivable as well as a contrast value described in a catalog.

In addition, gray-scale representation by a PWM method is performed in a projector using a micromirror array device such as a DMD (Digital Micromirror Device) and some of portable projectors, for example. In the gray-scale representation by the PWM method, gray scales are represented with $2^n$ digital gray scales, and the gray scales are recognized in human cerebral processing. The gray-scale representation by the PWM method is a digital system; therefore, the number of gray-scale levels is limited. In gray-scale representation by a typical PWM method, memory allocated to a low gray-scale value side (a dark side) is generally insufficient, which causes a significant issue in expressive power of a black region. In a typical PWM method display apparatus, in particular, a diffusive representation technology for compensating for gray-scale representation is often provided; however, an artifact occurs in which noise particles are seen in a black portion of an image. Accordingly, it is difficult to say that image quality of a region on the low gray-scale value side is high. In addition, in the typical PWM method display apparatus, it is difficult to reproduce an ideal γ (gamma) curve in the region on the low gray-scale value side, which causes gray representation having rough textures. This is also behind black textures in HDR achieved in the liquid crystal display for TV, or the like.

It is therefore desirable to develop a technology for making it possible to improve gray-scale representation in performing generation of an image by the PWM method.

It is to be noted that PTL 1 (Japanese Unexamined Patent Application Publication No. 2006-285089) discloses a technology for improving contrast by providing each of an illumination optical system and a projection optical system with a variable diaphragm. However, the technology described in PTL 1 is for adjusting luminance of an entire image, and is not for controlling luminance for each gray-scale bit in PWM, for example. In contrast, in the technology of the present disclosure, as described later, a first variable diaphragm and a second variable diaphragm are included in an illumination optical system, and it is possible to control luminance for each scene and luminance for each gray-scale bit in PWM. According to the technology of the present disclosure, this makes it possible to increase a dynamic range in a screen, and improve gray-scale representation on the low gray-scale value side at which a display apparatus by the PWM method is not good.

1. First Embodiment

[1.1 Configuration of Display Apparatus According to First Embodiment]

FIG. 1 schematically illustrates a configuration example of a display apparatus according to a first embodiment of the present disclosure. FIG. 1 illustrates a configuration example of a projector 1 as an example of the display apparatus.

A case where the projector 1 performs full-color display is described below as an example. However, the technology of the present disclosure is also applicable in a case where monochromatic display is performed.

The projector 1 includes a light source 10, an illumination optical system 20, a light modulation element 30, a projection optical system 40, and a scheduler 50. The projector 1 also includes a first diaphragm driver 61, a second diaphragm driver 62, and a PWM sequencer 63.

The illumination optical system 20 includes a first variable diaphragm 21, a second variable diaphragm 22, and a rod integrator 23. The illumination optical system 20 may include an optical system such as a light collection optical system in addition to the rod integrator 23.

The scheduler 50 includes a first aperture diameter determining section 51, a second aperture diameter determining section 52, an average luminance calculating section 53, a gray-scale evaluation computing section 54, and a luminance information extracting section 55.

The light source 10 outputs color light that is a source of illumination light. The light source 10 includes, for example, a red (R) light source, a green (G) light source, and a blue (B) light source. The light source 10 includes, for example, a solid-state light source such as a semiconductor laser (LD: Laser Diode) and an LED (Light Emitting Diode).

An example of the light modulation element 30 is a mirror array device including a plurality of mirrors. The mirror array device is a micromirror array device, such as a DMD, including a plurality of micromirrors that corresponds to pixels and is arranged in an array (a matrix). The light modulation element 30 modulates illumination light for each color on the basis of an image signal Vin to generate a projected image.

The projection optical system 40 includes, for example, a plurality of lenses, and projects the projected image generated by the light modulation element 30 on a projection surface such as an unillustrated screen.

The image signal Vin is inputted into the PWM sequencer 63 via the scheduler 50. The PWM sequencer 63 controls a period of a sub-frame of each color in one frame of the image signal Vin. In addition, the PWM sequencer 63 controls a display period for each gray-scale bit of each color within the period of the sub-frame of each color.

The projector 1 further includes a bit-plane generating section that generates data of a bit-plane for each gray-scale bit corresponding to each of a plurality of gray-scale bits displayed in the period of the sub-frame of each color on the basis of the image signal Vin. The bit-plane generating section transfers data of a bit-plane for each generated gray-scale bit in units of a gray-scale bit to the light modulation element 30 before the display period for each gray-scale bit.

The illumination optical system 20 generates illumination light used for generation of an image by a pulse width modulation method on the basis of light from the light source 10. Each color light from the light source 10 enters the illumination optical system 20. The illumination optical system 20 equalizes each color light from the light source 10 by the rod integrator 23 to generate illumination light of each color. The light modulation element 30 is illuminated by the illumination light of each color generated by the illumination optical system 20.

In the illumination optical system 20, the first variable diaphragm 21 and the second variable diaphragm 22 are disposed in order of incidence of light from the light source 10. In the illumination optical system 20, the first variable diaphragm 21 and the second variable diaphragm 22 are disposed in front of (on the light source 10 side) of the rod integrator 23, for example. However, for example, the second variable diaphragm 22 may be disposed behind the rod integrator 23. Disposing the second variable diaphragm 22 behind the rod integrator 23 makes it possible to downsize a mechanism of the illumination optical system 20.

Figure 4:
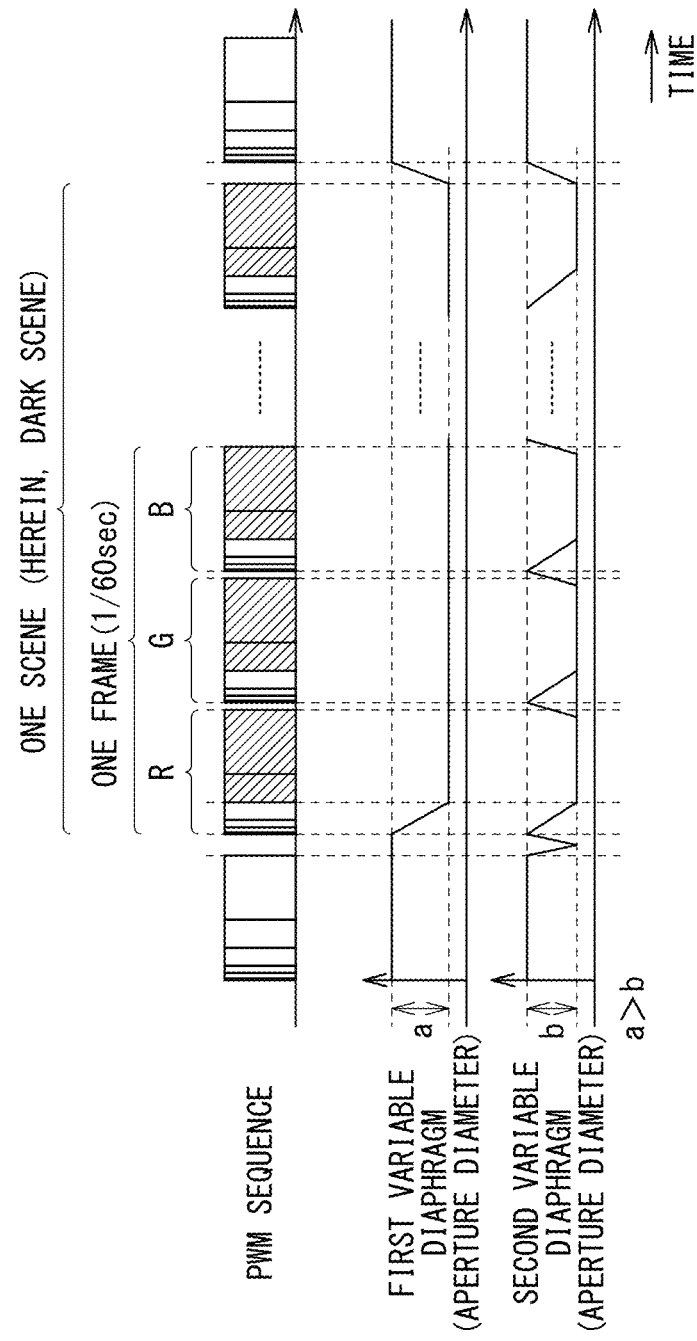
FIG. 4 is a timing chart illustrating an example of a PWM control sequence and opening-closing control sequences of the first and second variable diaphragms in the display apparatus according to the first embodiment.

The first variable diaphragm 21 performs an opening-closing operation at lower speed than the second variable diaphragm 22. A variable range of an aperture diameter of the first variable diaphragm 21 is preferably larger than a variable range of an aperture diameter of the second variable diaphragm 22. The first variable diaphragm 21 performs an opening-closing operation at least for each frame. For example, in a case where an HDR signal that makes it possible to identify a scene (an image scene) including at least one frame is inputted as the image signal Vin, opening and closing of the first variable diaphragm 21 are controlled for each scene, for example, as illustrated in FIG. 4 to be described later. The first variable diaphragm 21 is a diaphragm for dynamically adjusting luminance of an entire screen. The first variable diaphragm 21 plays a role in controlling average luminance of the entire screen for each scene, for example.

The second variable diaphragm 22 is able to perform an opening-closing operation at higher speed than the first variable diaphragm 21. The variable range of the aperture diameter of the second variable diaphragm 22 may be smaller than the variable range of the aperture diameter of the first variable diaphragm 21. The second variable diaphragm 22 is able to perform an opening-closing operation for each display period of at least a unit gray-scale bit (at least one bit-plane) as illustrated in FIG. 4 to be described later. The second variable diaphragm 22 performs the opening-closing operation in a period at least after the aperture diameter of the first variable diaphragm 21 becomes an aperture diameter determined by the first aperture diameter determining section 51.

The second variable diaphragm 22 is disposed closer to the light modulation element 30 than the first variable diaphragm 21, and performs the opening-closing operation mainly around a region on the low gray-scale value side in synchronization with gray scales of a PWM sequence, for example. The second variable diaphragm 22 plays a role in effectively increasing gray-scale representation by PWM by further condensing light having passed through the first variable diaphragm 21 (about 0% to about 100%). Opening and closing of the second variable diaphragm 22 are preferably controlled for each unit gray-scale bit, but may be controlled for each group of a plurality of gray-scale bits. For example, in a case where the gray-scale bits of the PWM sequence include bit 1 to bit 10 as a whole, the gray-scale bits may be divided into 2 to 5 gray-scale bit groups in consideration of cost and the size of a motor that drives the second variable diaphragm 22, and opening and closing of the second variable diaphragm 22 may be controlled for each gray-scale bit group. Alternatively, even if the second variable diaphragm 22 is driven mainly for gray-scale bits on the low gray-scale value side having a sense of noise, an effect of improving gray-scale representation is expectable.

Figure 2:
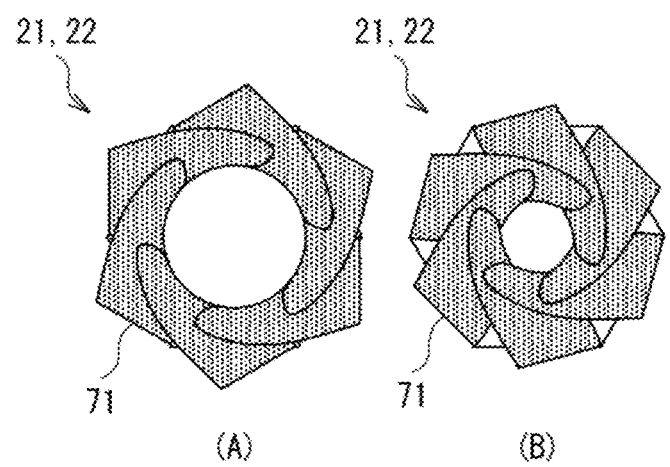
FIG. 2 is a schematic front view of configuration examples of first and second variable diaphragms in the display apparatus according to the first embodiment.
Figure 3:
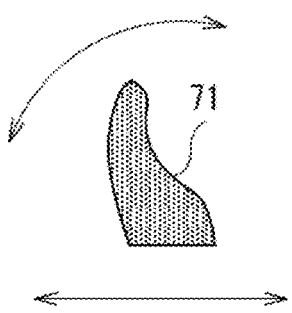
FIG. 3 is a schematic front view of a configuration example of a diaphragm blade of each of the first and second variable diaphragms.

FIG. 2 schematically illustrates a configuration example of the first and second variable diaphragms 21 and 22. In FIG. 2, (A) illustrates an example of a state in which an aperture diameter is relatively large (an open state), and (B) illustrates an example of a state in which the aperture diameter is relatively small (a closed state). FIG. 3 schematically illustrates a configuration example of a diaphragm blade 71 of each of the first and second variable diaphragms 21 and 22.

Examples of each of the first and second variable diaphragms 21 and 22 may include a typical iris diaphragm. The iris diaphragm includes a plurality of diaphragm blades 71. It is possible to drive each of the plurality of diaphragm blades 71 as illustrated in FIG. 3. For driving of the second variable diaphragm 22, high speed and high accuracy are demanded in accordance with the PWM sequence. In a case where the second variable diaphragm 22 is the iris diaphragm, it is desirable to control each of the diaphragm blades 71 by, for example, an MEMS (Micro Electro Mechanical Systems) actuator such as a DD (Direct Drive)-SSM (Super Sonic Motor).

The scheduler 50 computes, for example, average luminance for each scene and a gray-scale value (on a low gray-scale value side in particular) in a screen from the image signal Vin, and determines indication values of the aperture diameter of the first variable diaphragm 21 and the aperture diameter of the second variable diaphragm 22 from each of the average luminance and the gray-scale value.

The luminance information extracting section 55 extracts luminance information in the image signal Vin, and outputs the luminance information to the average luminance calculating section 53 and the gray-scale evaluation computing section 54.

The average luminance calculating section 53 calculates average luminance at least for each frame in the image signal Vin on the basis of the luminance information in the image signal Vin. The average luminance calculating section 53 calculates average luminance for each scene including at least one frame.

The gray-scale evaluation computing section 54 evaluates a gray-scale value in the screen for each display period of at least a unit gray-scale bit (at least one bit-plane) on the basis of the luminance information in the image signal Vin.

The first aperture diameter determining section 51 determines the aperture diameter of the first variable diaphragm on the basis of the average luminance calculated by a luminance calculating section. The first aperture diameter determining section 51 outputs an indication value corresponding to the determined aperture diameter of the first variable diaphragm to the first diaphragm driver 61.

The second aperture diameter determining section 52 determines the aperture diameter of the second variable diaphragm 22 on the basis of evaluation by the gray-scale evaluation computing section. The second aperture diameter determining section 52 determines the aperture diameter of the second variable diaphragm 22 at least for each unit gray-scale bit. The second aperture diameter determining section 52 outputs an indication value corresponding to the determined aperture diameter of the second variable diaphragm 22 to the second diaphragm driver 62.

The first diaphragm driver 61 drives the first variable diaphragm 21 on the indication value from the first aperture diameter determining section 51, and controls the aperture diameter of the first variable diaphragm 21. The aperture diameter of the first variable diaphragm 21 is generally controllable by open-loop control. Feedback loop control is used to cope with highly accurate luminance representation desired for high-class models and cinema applications. It is sufficient if a drive frequency of the first variable diaphragm 21 by the first diaphragm driver 61 is faster than pupil change, and the drive frequency is 60 Hz, for example, in a case where a frame rate is 60 Hz.

The second diaphragm driver 62 drives the second variable diaphragm 22 on the basis of the indication value from the second aperture diameter determining section 52, and controls the aperture diameter of the second variable diaphragm 22. It is desirable that a drive frequency of the second variable diaphragm 22 by the second diaphragm driver 62 be synchronized with bits of the PWM sequence, and is 1.8 kHz to 14.4 kHz, for example, in a case where the frame rate is 60 Hz.

[1.2 Operation of Display Apparatus According to First Embodiment]

Figure 5:
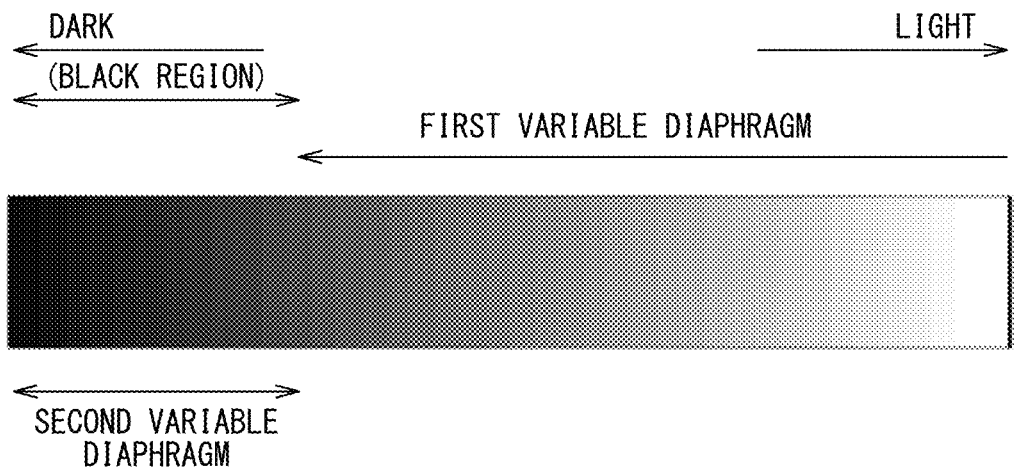
FIG. 5 is an explanatory diagram illustrating an example of a relationship between opening-closing operations of the first and second variable diaphragms and gray scales in the display apparatus according to the first embodiment.

FIG. 4 illustrates an example of a PWM control sequence in the projector 1 and opening-closing control sequences of the first and second variable diaphragms 21 and 22 in order from top. FIG. 5 illustrates an example of a relationship between opening-closing operations of the first and second variable diaphragms 21 and 22 and gray scales in the projector 1.

In a case where gray-scale representation is performed by a typical PWM method, the light modulation element 30 is continuously irradiated with light having constant luminance. The light modulation element 30 controls modulation of light for each pixel into two states, that is, light and dark (white and black) states. The light modulation element 30 changes a modulation timing of light for each pixel to change a pulse width of the light, thereby performing gray-scale representation.

In a case where gray-scale representation is performed by the PWM method, for example, it is possible to represent a 16-gray-scale image by combining at least four kinds of images different in luminance in a predetermined period (generally one frame). That is, in a case where 16 gray scales are represented, first, for example, luminance is quantized for each pixel into four gray-scale bits. For example, image data of one frame is then represented by a combination of four kinds of image data weighted by each gray-scale bit. At this time, a group of image data for each gray-scale bit is generally referred to as a "bit-plane". The bit-plane is a luminance information plane for each gray-scale bit.

For example, in a case where 1024 gray scales are represented, it is possible to perform discrete gray-scale representation by combining unit gray-scale bits having pulse widths of 1, 2, 4, 8, . . . , 255 for each color. FIG. 4 illustrates an example in which one frame is divided into sub-frames of respective colors of R, G, and B and each of the sub-frames of the respective colors is displayed in order of bit-planes having unit gray-scale bit sizes of 1, 2, 4, 8, . . . , 255. In the PWM control sequence at the top in FIG. 4, an outlined portion indicates a state in which brightness is light (white), and a diagonal mesh portion indicates a state in which brightness is dark (black).

FIG. 4 indicates a simplified simple control sequence. For example, one dark scene is considered. Needless to say, the screen is entirely dark, which causes the aperture diameter of the first variable diaphragm 21 to be reduced. Thus far, this is a concept of dynamic contrast used for projectors in general.

Next, securement of a dynamic range in the screen is considered. If the first variable diaphragm 21 is narrowed in accordance with a blackest portion in the screen, a whitest portion in the screen also becomes dark. This is a phenomenon in which a view outside a window that is supposed to be light becomes dark in a scene of a dark room, and this phenomenon is solved in HDR TVs, but is an issue in projectors. In contrast, in a case where adjustment is performed in accordance with a white portion, darkness in the room is lost this time, which causes solid image quality.

Accordingly, in the projector 1, a control amount of the aperture diameter of the first variable diaphragm 21 is set to give a relatively high priority to a white (light) side. In addition, a method is taken of weakening black by the second variable diaphragm 22. That is, the second variable diaphragm 22 is controlled to be narrowed on a black side of the PWM sequence. Accordingly, for example, as illustrated in FIG. 5, brightness in gray scales other than a black region is dynamically controlled by the first variable diaphragm 21, and brightness in the black region is dynamically controlled by the second variable diaphragm 22. It is to be noted that, for example, a variable range a of the aperture diameter of the first variable diaphragm 21 is larger than a variable range b of the aperture diameter of the second variable diaphragm 22. In the black region, brightness is decreased to a certain degree by the first variable diaphragm 21, and thereafter the brightness is further decreased by the second variable diaphragm 22. The second variable diaphragm 22 is controlled to be narrowed on the black side of the PWM sequence. The black region in which brightness is controlled by the second variable diaphragm 22 may be a dark region having about ⅓ of the lightest gray-scale value.

[1.3 Effects]

As described above, in the projector 1 according to the first embodiment, it is possible to improve gray-scale representation in performing generation of an image by the PWM method.

In the projector 1 according to the first embodiment, the dynamic range in the screen is improved, and in particular, textures of gray-scale representation on the low gray-scale value side are improved. According to the projector 1, a diaphragm in the illumination optical system 20 has a two-series configuration including the first and second variable diaphragms 21 and 22, and feedback control is performed on the first and second variable diaphragms 21 and 22 by average luminance and the gray-scale value of an image, which makes it possible not only to adjust a light amount of the entire screen, but also to improve gray-scale representation on a dark side. According to the projector 1, it is possible to improve a contrast ratio in one screen without roughness while increasing the number of gray scales in the black region to $2^n$ or more. According to the projector 1, it is possible to improve dynamic contrast with an existing light source.

Figure 6:
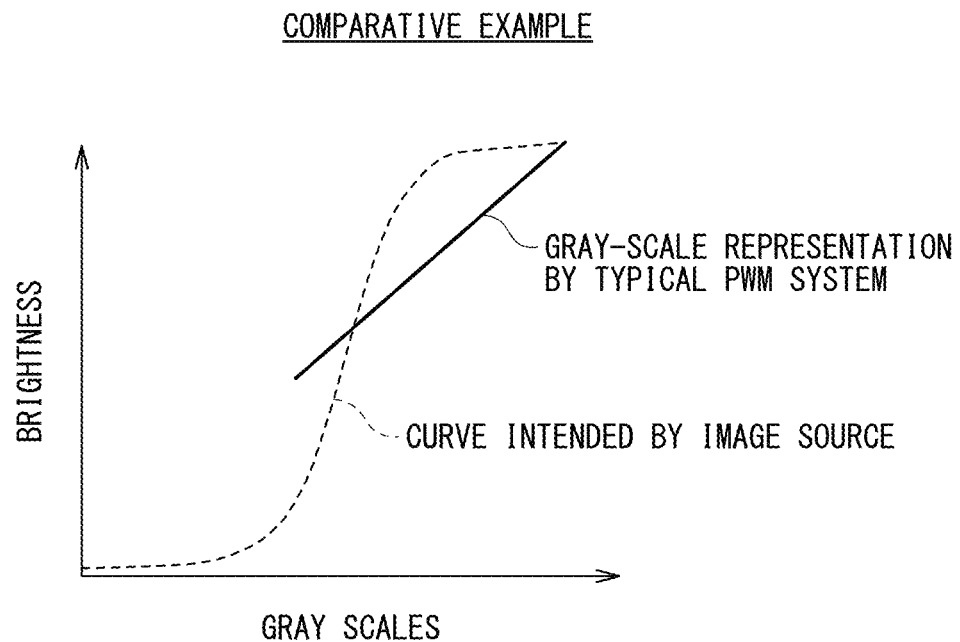
FIG. 6 is an explanatory diagram illustrating a first example of gray-scale response characteristics in a display apparatus according to a comparative example.
Figure 7:
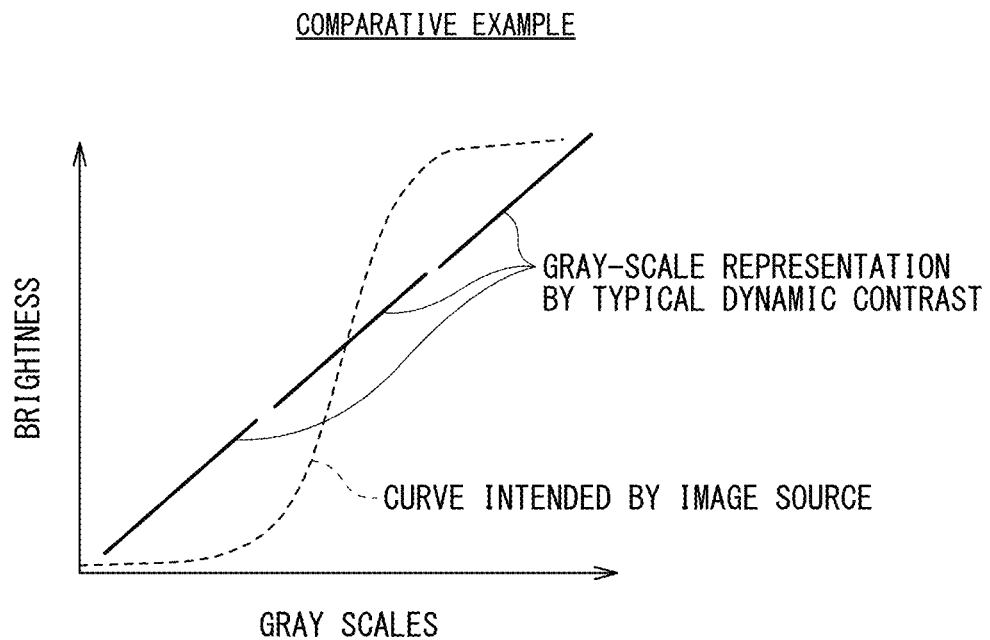
FIG. 7 is an explanatory diagram illustrating a second example of gray-scale response characteristics in the display apparatus according to the comparative example.
Figure 8:
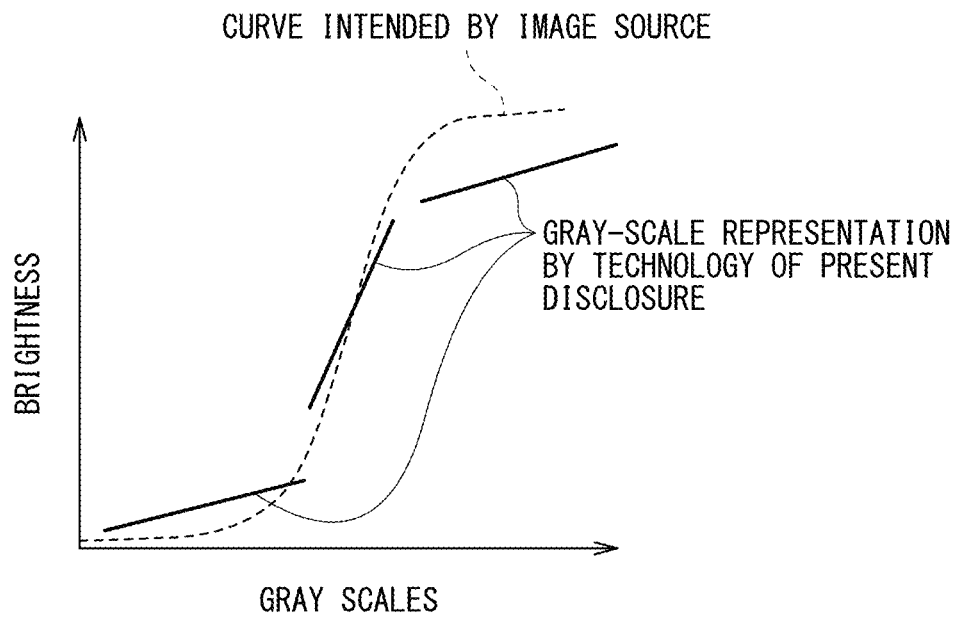
FIG. 8 is an explanatory diagram illustrating an example of gray-scale response characteristics in the display apparatus according to the first embodiment.

FIG. 6 illustrates a first example of gray-scale response characteristics in a display apparatus according to a comparative example. FIG. 7 illustrates a second example of gray-scale response characteristics in the display apparatus according to the comparative example. FIG. 8 illustrates an example of gray-scale response characteristics in the projector 1 according to the technology of the present disclosure. In FIGS. 6 to 8, a horizontal axis indicates gray scales and a vertical axis indicates brightness. A broken line indicates a γ curve intended by an image source.

In FIG. 6, a solid line schematically indicates gray-scale representation by a typical PWM method. In FIG. 7, a solid line schematically indicates gray-scale representation by typical dynamic contrast. As illustrated in FIG. 6, in the typical PWM method, a dynamic range is narrow. Meanwhile, as illustrated in FIG. 7, it is possible to expand the dynamic range by a technology of the typical dynamic contrast; however, it is not possible to sufficiently reproduce the γ curve intended by the image source.

In FIG. 8, a s solid line schematically indicates gray-scale representation by the technology of the present disclosure. In the technology of the present disclosure, it is possible to expand the dynamic range by the first variable diaphragm 21, similarly to the technology of the typical dynamic contrast. Furthermore, it is possible to adjust a gradient of gray-scale response characteristics by the second variable diaphragm 22, which makes it possible to bring the gradient close to the γ curve intended by the image source.

Next, gray-scale representation achievable by the projector 1 according to the first embodiment is described in more details with reference to FIGS. 9 to 16.

Figure 9:
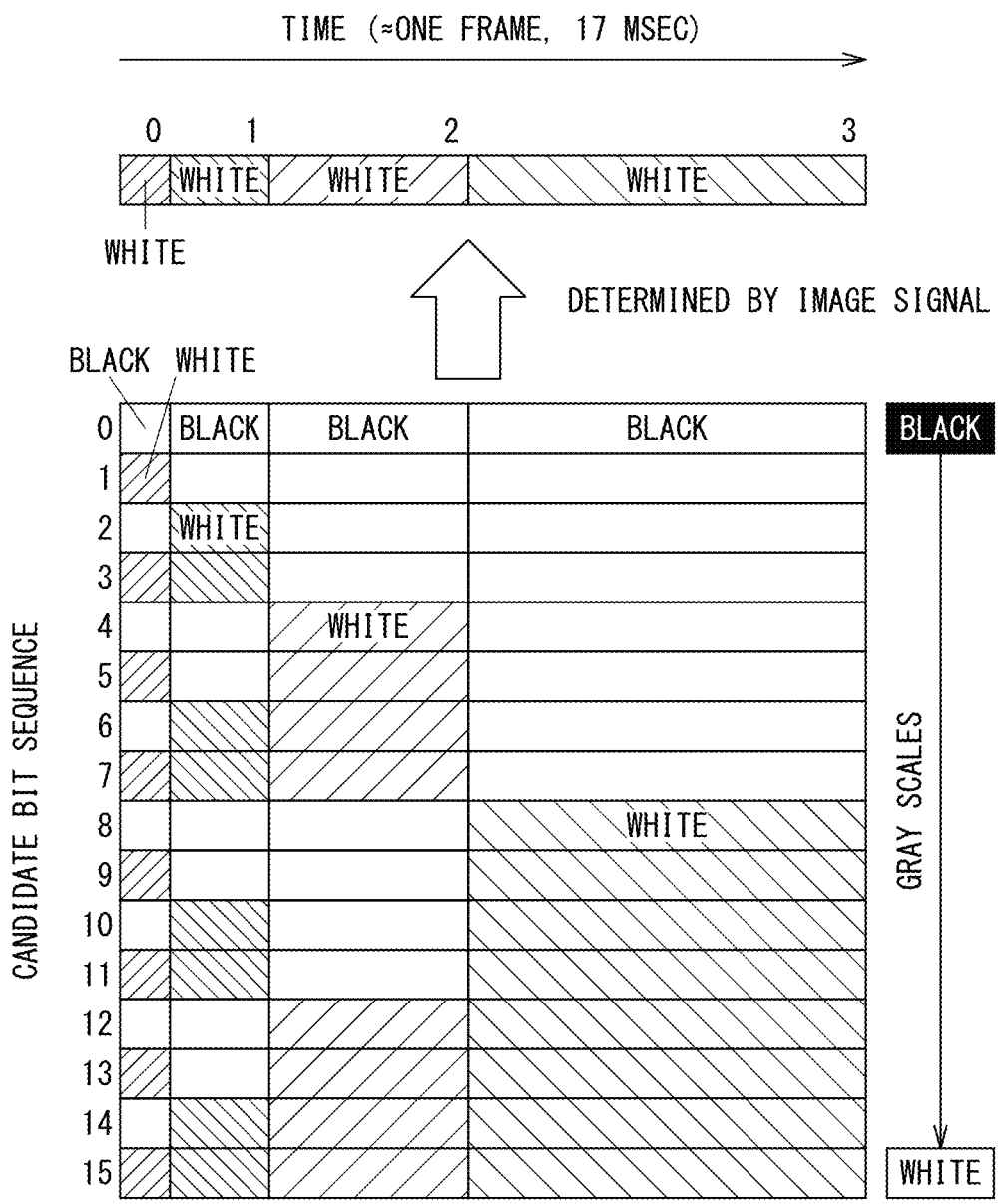
FIG. 9 is an explanatory diagram illustrating an example of a gray-scale generation rule by a typical PWM method.

FIG. 9 illustrates an example of a gray-scale generation rule by the typical PWM method. For simplification, FIG. 9 illustrates an example of 4-bit monocolor. It is to be noted that 8 to 12-bit full-color is mainstream of actual products of projectors. Expansion of the dynamic range that is an effect by the technology of the present disclosure and gray-scale representation power (resolution) are effective irrespective of the number of bits.

The number of gray scales representable with four bits is $2^4=16$. A period of one frame is 1/frame rate. FIG. 9 illustrates an example of a bit sequence of 16 bits for representing 16 gray scales in one 4-bit monocolor frame.

Figure 10:
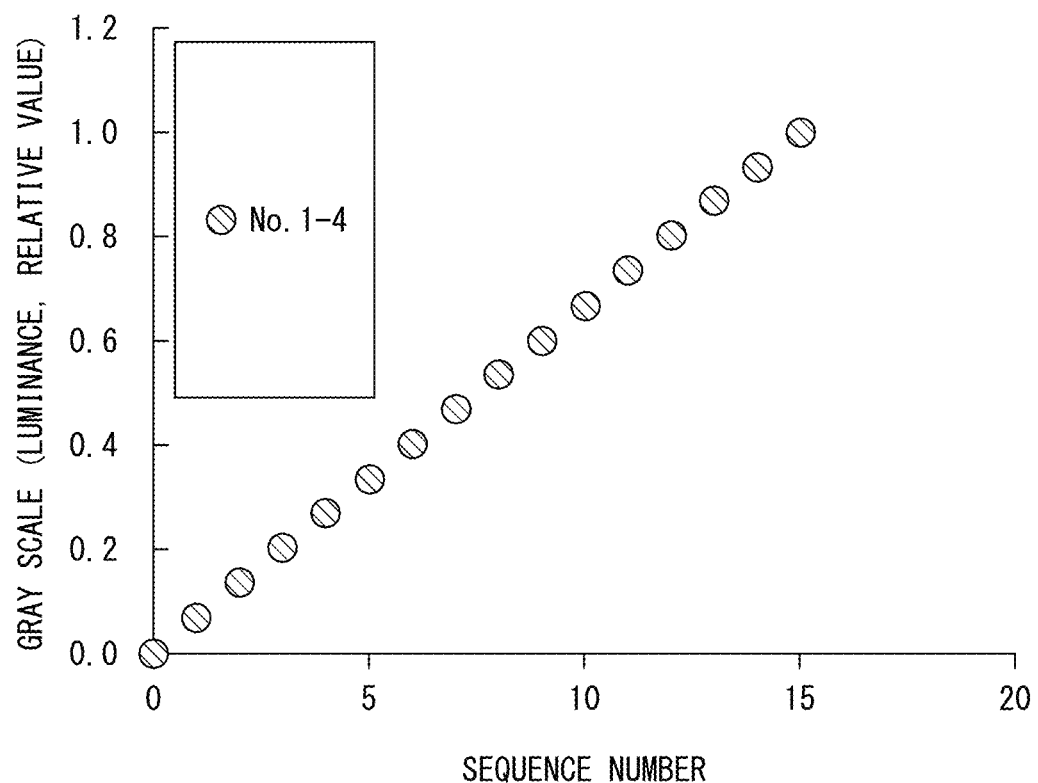
FIG. 10 is an explanatory diagram illustrating an example of a relationship between a bit sequence and luminance in a typical PWM method projector.

FIG. 10 illustrates an example of a relationship between a bit sequence and luminance in a typical PWM method projector. In the typical PWM method projector, a light modulation element includes a binary device, which causes the relationship between the bit sequence and luminance to be linear as illustrated in FIG. 10. It is to be noted that FIG. 10 corresponds to a case where an aperture ratio of a variable diaphragm is in a state of No. 1-4 in FIG. 11 to be described later.

Figure 11:
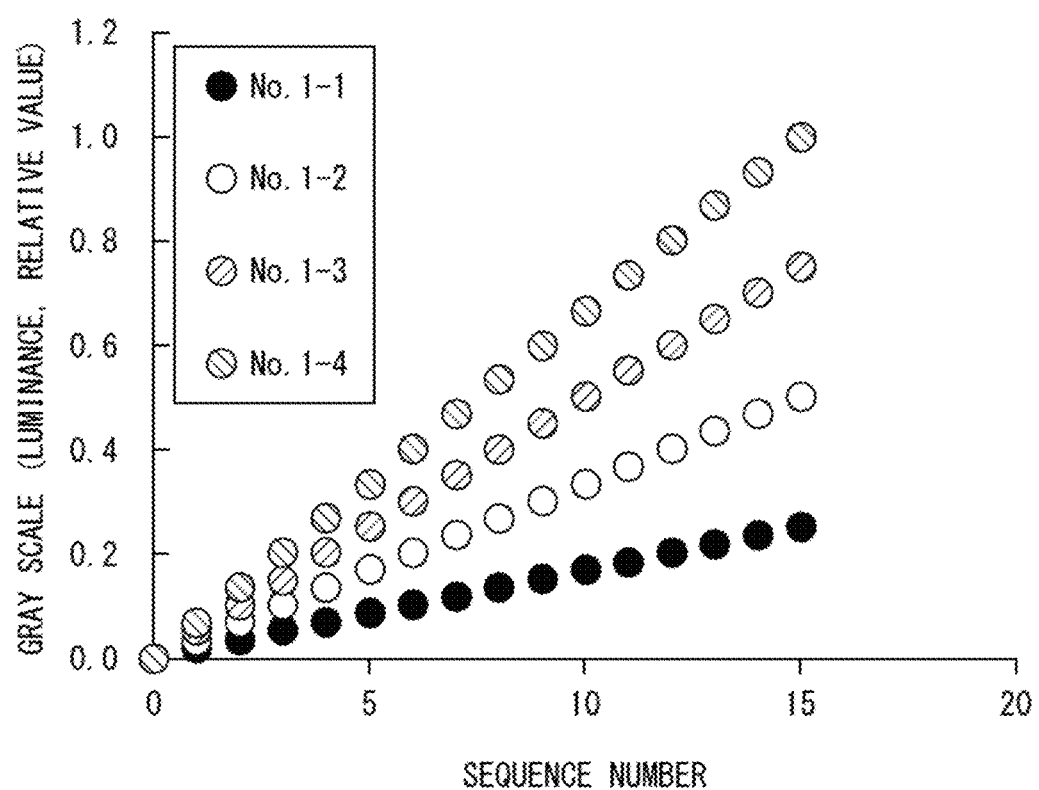
FIG. 11 is an explanatory diagram illustrating an example of a relationship between a bit sequence and luminance in a case where a single variable diaphragm is added in the typical PWM method projector.

FIG. 11 illustrates an example of a relationship between a bit sequence and luminance in a case where a single variable diaphragm is added in the typical PWM method projector. The single variable diaphragm is disposed in an illumination optical system or a projection optical system, for example. FIG. 11 illustrates an example of a relationship between a bit sequence and luminance in which the aperture ratio of the single variable diaphragm is changed to No. 1-1, No. 1-2, No. 1-3, and No. 1-4. The aperture ratio of each No. is as follows.

|  | Aperture Ratio |
| --- | --- |
| No. 1-1 | 25% |
| No. 1-2 | 50% |
| No. 1-3 | 75% |
| No. 1-4 | 100% |

As illustrated in FIG. 11, the lower the aperture ratio of the single variable diaphragm is, the more a gray-scale interval is reduced. Accordingly, providing the single variable diaphragm is effective in a case where it is desired to increase black gray scales, and is generally known as a technology of dynamic contrast. In this technology of dynamic contrast, the lower the aperture ratio is, the more an entire dynamic range is decreased (worsened).

Figure 12:
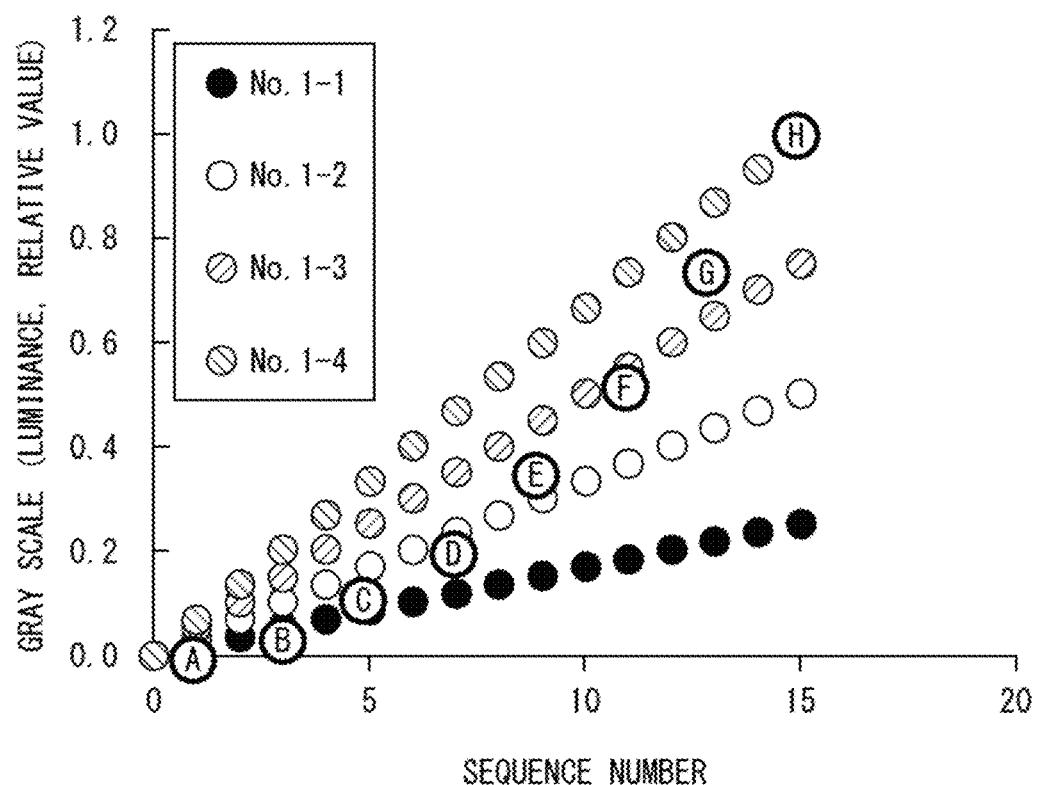
FIG. 12 is an explanatory diagram illustrating an example of desirable gray-scale characteristics.

FIG. 12 illustrates an example of desirable gray-scale characteristics. FIG. 12 illustrates an example of desirable gray-scale characteristics ((A) to (H)) with respect to gray-scale characteristics (the relationship between the bit sequence and luminance) illustrated in FIG. 11. Human eyes have higher sensitivity on a dark side than on a light side. Accordingly, gray-scale representation is superior in a case where a gray-scale interval on the dark side is small and a gray-scale interval on the light side is wide (large). It is therefore desirable to perform gray-scale control to have characteristics that pass through points (A) to (H) as illustrated in FIG. 12, for example.

Figure 13:
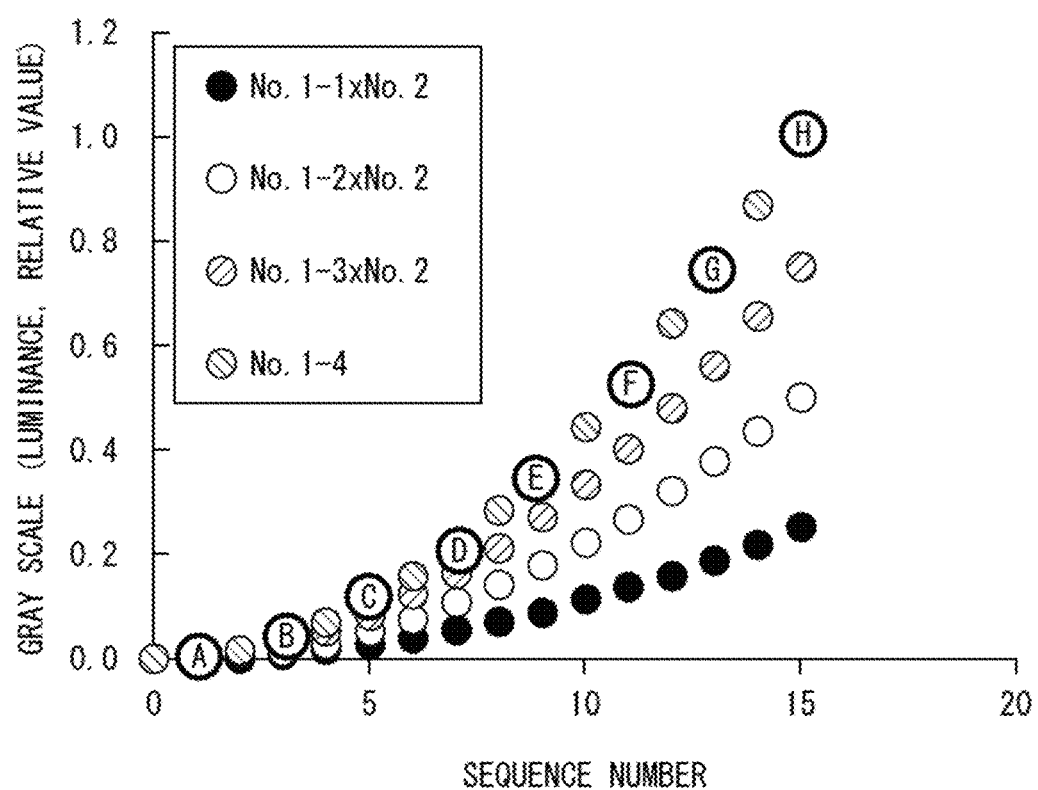
FIG. 13 is an explanatory diagram illustrating an example of gray-scale representation achievable in the display apparatus according to the first embodiment.

FIG. 13 illustrates an example of gray-scale representation achievable by the display apparatus (the projector 1) according to the first embodiment. In the projector 1 according to the first embodiment, as described above, desired gray-scale representation is achievable by a combination of the first variable diaphragm 21 and the second variable diaphragm 22. In FIG. 13, as with FIG. 11, the aperture ratio of the first variable diaphragm 21 is indicated by No. 1-1, No. 1-2, No. 1-3, and No. 1-4. In addition, No. 2 indicates an aperture ratio of the second variable diaphragm 22. FIG. 14 illustrates a relationship between sequence numbers in a PWM sequence and an aperture ratio of the second variable diaphragm. The aperture ratio of the second variable diaphragm 22 is changed for each bit sequence, for example. Accordingly, in a case where the aperture ratio of the first variable diaphragm 21 is No. 1-4, the aperture ratio of the second variable diaphragm 22 is changed for each bit sequence (No. 1-4×No. 2) as illustrated in FIG. 14, which makes it possible to obtain desired characteristics that pass through the points (A) to (H) illustrated in FIG. 12.

It is to be noted that the aperture ratio of the first variable diaphragm 21 and the aperture ratio of the second variable diaphragm 22 illustrated in FIGS. 13 and 14 are examples, and are not limited to the illustrated examples.

Figure 15:
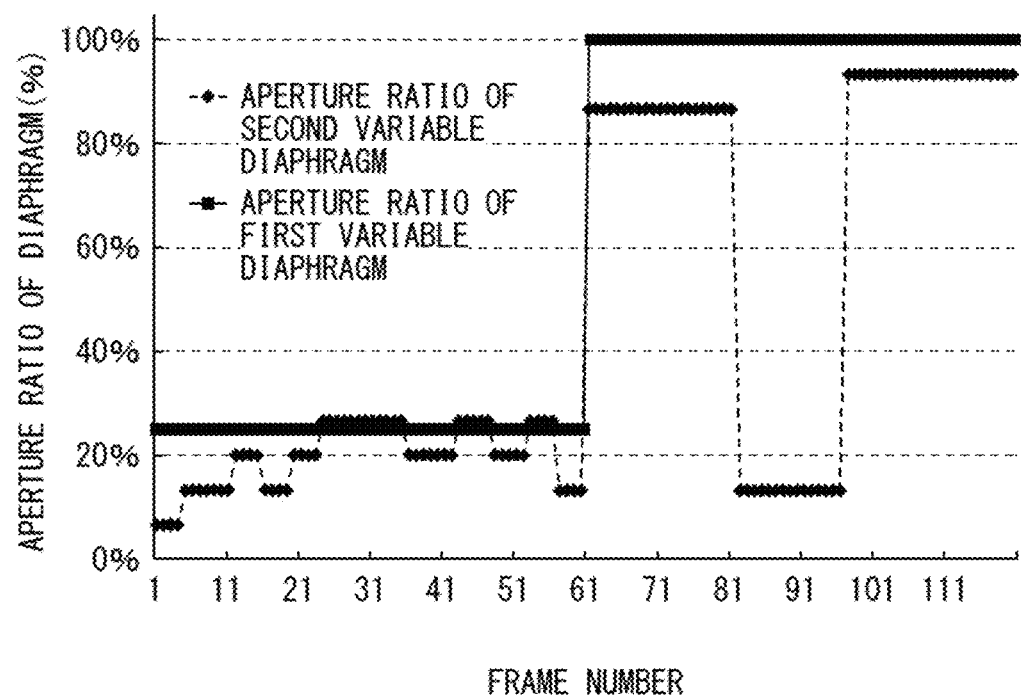
FIG. 15 is an explanatory diagram illustrating a control example of an aperture ratio of each of the first variable diaphragm and the second variable diaphragm for each frame in the display apparatus according to the first embodiment.
Figure 16:
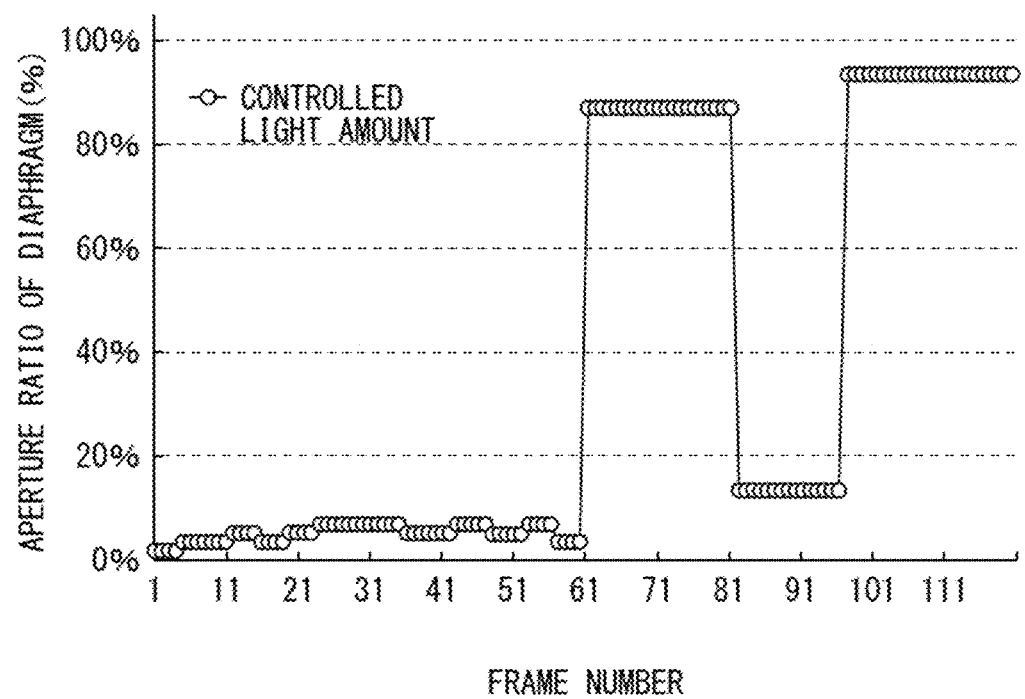
FIG. 16 is an explanatory diagram illustrating an example of an apparent controlled light amount for each frame in the display apparatus according to the first embodiment.

FIG. 15 illustrates a control example of an aperture ratio of each of the first variable diaphragm 21 and the second variable diaphragm 22 for each frame in the display apparatus (the projector 1) according to the first embodiment. FIG. 16 illustrates an example of an apparent controlled light amount for each frame in a case where the aperture ratio of each of the first variable diaphragm 21 and the second variable diaphragm 21 is controlled as illustrated in FIG. 15. As illustrated in FIG. 16, the apparent controlled light amount is a light amount corresponding to the aperture ratio of the first variable diaphragm 21 and the aperture ratio of the second variable diaphragm 21.

It is to be noted that the effects described in this specification are merely illustrative and non-limiting, and other effects may be provided. The same applies to effects of the following other embodiments.

[1.4 Modification Example of First Embodiment]

In the first embodiment, luminance of light outputted from the light source 10 is described as being constant; however, luminance of light outputted from the light source 10 may be variable in accordance with a gray-scale value. This allows for more highly accurate gray-scale representation.

2. Other Embodiments

The technology according to the present disclosure is not limited to description of the respective embodiments described above, and may be modified in a variety of ways.

For example, the present technology may have the following configurations.

According to the present technology of the following configurations, it is possible to improve gray-scale representation in performing generation of an image by the PWM method.

(1)

An illumination device including:

an illumination optical system that includes a first variable diaphragm and a second variable diaphragm in order of incidence of light from a light source, and generates illumination light used for generation of an image by a pulse width modulation method on the basis of light from the light source;

a luminance calculating section that calculates average luminance at least for each frame in an image signal;

a gray-scale evaluation computing section that evaluates a gray-scale value in a screen for each display period of at least a unit gray-scale bit;

a first aperture diameter determining section that determines an aperture diameter of the first variable diaphragm on the basis of the average luminance calculated by the luminance calculating section; and a second aperture diameter determining section that determines an aperture diameter of the second variable diaphragm on the basis of evaluation by the gray-scale evaluation computing section.

(2)

The illumination device according to (1), in which the luminance calculating section calculates average luminance for each scene including at least one frame.

(3)

The illumination device according to (1) or (2), in which the second variable diaphragm is configured to perform an opening-closing operation at higher speed than the first variable diaphragm.

(4)

The illumination device according to any one of (1) to (3), in which a variable range of the aperture diameter of the second variable diaphragm is smaller than a variable range of the aperture diameter of the first variable diaphragm.

(5)

The illumination device according to any one of (1) to (4), in which the first variable diaphragm performs an opening-closing operation at least for each frame.

(6)

The illumination device according to any one of (1) to (5), in which the second aperture diameter determining section determines the aperture diameter of the second variable diaphragm at least for each the unit gray-scale bit, and the second variable diaphragm performs an opening-closing operation at least for each display period of the unit gray-scale bit.

(7)

The illumination device according to any one of (1) to (6), in which the second variable diaphragm performs an opening-closing operation at least in a period after the aperture diameter of the first variable diaphragm becomes an aperture diameter determined by the first aperture diameter determining section.

(8)

The illumination device according to any one of (1) to (7), in which the first and second variable diaphragms each include an iris diaphragm.

(9)

A display apparatus including:

a light modulation element that modulates illumination light by a pulse width modulation method to generate an image;

an illumination optical system that includes a first variable diaphragm and a second variable diaphragm in order of incidence of light from a light source, and generates illumination light used for generation of an image by the pulse width modulation method on the basis of light from the light source;

a luminance calculating section that calculates average luminance at least for each frame in an image signal;

a gray-scale evaluation computing section that evaluates a gray-scale value in a screen for each display period of at least a unit gray-scale bit;

a first aperture diameter determining section that determines an aperture diameter of the first variable diaphragm on the basis of the average luminance calculated by the luminance calculating section; and a second aperture diameter determining section that determines an aperture diameter of the second variable diaphragm on the basis of evaluation by the gray-scale evaluation computing section.

(10)

The display apparatus according to (9), further including a projection optical system that projects the image generated by the light modulation element.

This application claims the benefit of Japanese Priority Patent Application JP2018-191945 filed with the Japan Patent Office on Oct. 10, 2018, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An illumination device, comprising:
an illumination optical system that includes a first variable diaphragm and a second variable diaphragm in order of incidence of light from a light source, and that generates illumination light used for generation of an image by a pulse width modulation method on a basis of light from the light source;
a scheduler, wherein the scheduler comprises:
a luminance calculator that calculates average luminance at least for each frame in an image signal;
a gray-scale evaluation computer that evaluates a gray-scale value in a screen for each display period of at least a unit gray-scale bit;
a first aperture diameter determiner that determines an aperture diameter of the first variable diaphragm on a basis of the calculated average luminance calculated by the luminance calculator; and
a second aperture diameter determiner that determines an aperture diameter of the second variable diaphragm on a basis of the evaluation by the gray-scale evaluation computer, wherein the second variable diaphragm is configured to perform an opening-closing operation at a higher speed than the first variable diaphragm.

2. The illumination device according to claim 1, wherein the luminance calculator calculates average luminance for each scene including at least one frame.

3. The illumination device according to claim 1, wherein a variable range of the aperture diameter of the second variable diaphragm is smaller than a variable range of the aperture diameter of the first variable diaphragm.

4. The illumination device according to claim 1, wherein the first variable diaphragm performs an opening-closing operation at least for each frame.

5. The illumination device according to claim 1, wherein
the second aperture diameter determiner determines the aperture diameter of the second variable diaphragm at least for each unit gray-scale bit, and
the second variable diaphragm performs an opening-closing operation at least for each display period of each unit gray-scale bit.

6. The illumination device according to claim 1, wherein the second variable diaphragm performs an opening-closing operation at least in a period after the aperture diameter of the first variable diaphragm becomes an aperture diameter determined by the first aperture diameter determiner.

7. The illumination device according to claim 1, wherein the first and second variable diaphragms each include an iris diaphragm.

8. A display apparatus comprising:
a light modulation element that modulates illumination light by a pulse width modulation method to generate an image;
an illumination optical system that includes a first variable diaphragm and a second variable diaphragm in order of incidence of light from a light source, and generates illumination light used for generation of the image by the pulse width modulation method on a basis of light from the light source;
a scheduler, wherein the scheduler comprises:
a luminance calculator that calculates average luminance at least for each frame in an image signal;
a gray-scale evaluation computer that evaluates a gray-scale value in a screen for each display period of at least a unit gray-scale bit;
a first aperture diameter determiner that determines an aperture diameter of the first variable diaphragm on a basis of the average luminance calculated by the luminance calculator; and
a second aperture diameter determiner that determines an aperture diameter of the second variable diaphragm on a basis of the evaluation by the gray-scale evaluation computer, wherein a variable range of the aperture diameter of the second variable diaphragm is smaller than a variable range of the aperture diameter of the first variable diaphragm.

9. The display apparatus according to claim 8, further comprising a projection optical system that projects the image generated by the light modulation element.

10. The display apparatus according to claim 8, wherein the second variable diaphragm is configured to perform an opening-closing operation at higher speed than the first variable diaphragm.

11. A method of generating illumination light, comprising:
providing an illumination optical system that includes a first variable diaphragm and a second variable diaphragm in order of incidence of light from a light source, wherein the illumination optical system is operable to generate an image by a pulse width modulation method on a basis of light from the light source;
calculating average luminance at least for each frame in an image signal;
evaluating a gray-scale value in a screen for each display period of at least a unit gray-scale bit;
determining an aperture diameter of the first variable diaphragm on a basis of the calculated average luminance; and
determining an aperture diameter of the second variable diaphragm on a basis of the evaluating, wherein the second variable diaphragm is configured to perform an opening-closing operating at a higher speed than the first variable diaphragm.

12. The method according to claim 11, wherein a variable range of the aperture diameter of the second variable diaphragm is smaller than a variable range of the aperture diameter of the first variable diaphragm.

13. The method according to claim 11, wherein the first variable diaphragm performs an opening-closing operation at least for each frame of the image signal.

14. The method according to claim 11, wherein the aperture diameter of the second variable diaphragm at least for each unit gray-scale bit is determined, and
the second variable diaphragm performs an opening-closing operation at least for each display period of each unit gray-scale bit.

15. The method according to claim 11, wherein the second variable diaphragm performs an opening-closing operation at least in a period after the aperture diameter of the first variable diaphragm becomes a determined aperture.

* * * * *